(12) United States Patent
Eto et al.

(10) Patent No.: US 8,147,106 B2
(45) Date of Patent: Apr. 3, 2012

(54) AUTOMOTIVE HEADLAMP

(75) Inventors: Toyozo Eto, Shizuoka (JP); Yasuhiro Katsumata, Shizuoka (JP)

(73) Assignee: Koito Manufacturing Co., Ltd, Tokyo (JP)

( * ) Notice: Subject to any disclaimer, the term of this patent is extended or adjusted under 35 U.S.C. 154(b) by 1777 days.

(21) Appl. No.: 11/137,380

(22) Filed: May 26, 2005

(65) Prior Publication Data

US 2005/0262954 A1    Dec. 1, 2005

(30) Foreign Application Priority Data

Jun. 1, 2004   (JP) .............................. P. 2004-162983

(51) Int. Cl.
*F21V 19/02* (2006.01)
*F21V 21/14* (2006.01)

(52) U.S. Cl. ........ 362/523; 362/419; 362/427; 362/507; 362/508

(58) Field of Classification Search .......... 362/418–419, 362/427–428, 507, 512, 523, 508
See application file for complete search history.

(56) References Cited

U.S. PATENT DOCUMENTS

| | | | |
|---|---|---|---|
| 3,507,600 A * | 4/1970 | Cress .......................... | 401/258 |
| 4,707,771 A | 11/1987 | Van Duyn et al. | |
| 6,086,233 A | 7/2000 | Maeda | |
| 6,910,789 B2 | 6/2005 | Tanaka | |
| 2001/0036080 A1 | 11/2001 | Shirai | |
| 2002/0085386 A1 | 7/2002 | Shirai | |
| 2003/0117810 A1 | 6/2003 | Nakazawa et al. | |

FOREIGN PATENT DOCUMENTS

| | | |
|---|---|---|
| FR | 2833902 A1 | 6/2003 |
| GB | 2341673 A | 3/2000 |
| JP | 5-196747 A | 8/1993 |
| JP | 5-290604 A | 11/1993 |
| JP | 2001-351407 A | 12/2001 |
| JP | 2002-193023 A | 7/2002 |
| JP | 2002-193024 A | 7/2002 |
| JP | 2003-197009 A | 7/2003 |
| JP | 2003-260978 A | 9/2003 |

OTHER PUBLICATIONS

Preliminary Search Report dated Nov. 17, 2009 in French Application No. 0505546.
Japanese Office Action dated Sep. 30, 2009 in Application No. 2004-162983.

* cited by examiner

*Primary Examiner* — Jason Moon Han
(74) *Attorney, Agent, or Firm* — Sughrue Mion, PLLC

(57) ABSTRACT

A headlamp in which light source units are tilted about predetermined tilting center axes by means of an aiming mechanism interposed between a lamp body and the light source units. The aiming mechanism includes a tilting fulcrum (a ball and socket joint), aiming screws which are rotatably supported on the lamp body, and nut members which thread fit on the screws and mounted on the light source units movably in forward and backward in response to the rotations of the screws, so as to tilt the light source units about the tilting center axes. A leaf spring slide portion brought into elastic engagement with a guide groove is made of a polyacetal resin which is superior in resistance to wear. A nut member main body having a screw thread fitting portion is made of a nylon resin which is superior in resistance to heat. There is no permanent set on the slide portion and a slide contact surface does not wear, and no looseness is generated in the screw thread fitting portion of the nut member main body. An accurate optical axis adjustment can be ensured.

5 Claims, 12 Drawing Sheets

AUTOMOTIVE HEADLAMP

The present application claims foreign priority based on Japanese Patent Application No. P.2004-162983, filed on Jun. 1, 2004, the contents of which are incorporated herein by reference.

BACKGROUND OF THE INVENTION

1. Field of the Invention

The present invention relates to an automotive headlamp in which a light source unit is tilted about a predetermined tilting center axis by means of an optical axis adjustment mechanism interposed between a housing and the light source unit mounted in front of the housing so as to adjust (aim) the optical axis of the light source unit in a tilting fashion. More particularly, the present invention relates to an automotive headlamp including a synthetic resin nut member fittingly screwed on to an adjusting screw which is rotatably supported on the housing and mounted on the light source unit in such a manner as to interlock with the rotation of the adjusting screw for forward or backward movement so as to tilt the light source unit about a tilting center axis which passes through the tilting fulcrum.

2. Related Art

FIGS. 11 to 13 show one type of an automotive headlamp including a light source unit 22 having a light source 2b integrated into a reflector 2a. The light source unit 22 is supported on a front side of a lamp body 1 by an aiming mechanism. The aiming mechanism includes a ball and socket joint 3, which constitutes a tilting fulcrum, two aiming screws 4, 5 and two nut members 6, 7 which are thread fitted, respectively, on the aiming screws 4, 5 and forwardly and backwardly movable. The nut members 6, 7 constitute movable tilting fulcrums.

Namely, the synthetic resin nut member 6 (7), which is securely mounted on a bracket 2c (2d) of the light source unit 2 via a bearing 8, is thread fitted on the aiming screw 4 (5) which is rotatably supported on the lamp body 1 and which extends forwards. A leaf spring slide portion 6a (7a) is integrally formed on the nut member 6 (7) in such a manner as to be brought into an elastic engagement with a guide portion 9 provided on the lamp body 1 in such a manner as to extend longitudinally so as to carry thereon the nut member 6 (7). Then, by rotating the aiming screw 4 (5), the nut member 6 (7) moves forwards or backwards along the aiming screw 4 (5), and the light source unit 2 is tilted about a tilting center axis which passes through the ball and socket joint 3, whereby the optical axis of the lamp can be tilted and panned vertically and horizontally for adjustment.

In addition, the ball and socket joint 3 is made up of a slider 3a of an automatic headlight leveling actuator which moves forwards or backwards and a bearing 3b which is mounted on a bracket 2e of the light source unit 2 and makes up an automatic headlight leveling mechanism in which the slider 3a operates to move forwards or backwards according to a change in the inclination angle of the vehicle axis of an automotive vehicle in the longitudinal direction, whereby the light source unit 2 is tilted about a horizontal tilting center axis which passes through the nut members 6, 7. Note that a ball bearing portion 8a is provided on the bearing 8 for rotatably supporting a ball portion 6b (7b) of the nut member 6 (7) so as to avoid an unanticipated generation of stress on a mounting portion between the nut member 6 (7) and the light source unit 2 when the light source unit 2 is tilted.

Then, the bearing 8 and the nut member 6 (7) are made of a synthetic resin (for example, polyacetal resin) which is superior in sliding properties and resistance to wear in consideration of sliding properties and resistance to wear between the bearing 8 and the nut member 6 (7) and sliding properties and resistance to wear between the slide portion 6a (7a) and the guide portion 9.

In the automotive headlamp described above, however, when the aiming mechanism and the automatic headlight leveling mechanism are used for, in particular, a long period of time, a looseness is generated in the screw thread fitting portion of the nut member 6 (7) into which the aiming screw 4, (5) is thread fitted. As a result, there is a case that the optical axis of the lamp deviates independently.

SUMMARY OF THE INVENTION

Considering that the looseness is generated by vibrations, the inventor has studied about the cause for the problem by carrying out vibration tests in which vibrations were applied for a long period of time. As a result, the inventor confirmed that since the polyacetal resin making up the nut member is inferior in resistance to heat (deflection temperature), while being superior in sliding properties and resistance to wear, a looseness is generated in the screw thread fitting portion of the nut member into which the aiming screw is thread fitted. In particular, the heavier the light source unit becomes, the more the screw thread fitting portion becomes loose.

Then, the inventor made a nut member main body, in which the screw thread fitting portion is formed, of a nylon resin which is superior to the polyacetal resin in resistance to heat and integrated this nut member main body so made into a slide portion which is made of the polyacetal resin to thereby fabricate a nut member as an experiment. Next, the inventor carried out vibration tests in which vibrations were applied to the nut member for a long period of time. Then, since the results of the tests proved that no looseness was generated in the screw thread fitting portion of the nut member, the inventor decided to propose the invention.

The invention was made based on the problem inherent in the automotive headlamp described above and the knowledge of the inventor. Therefore, one or more embodiments of the present invention provides an automotive headlamp in which a smooth sliding property is obtained so that a nut member slides smoothly in a guide groove and a screw thread fitting portion of the nut member is prevented from becoming loose due to vibrations by using different materials for a nut member main body of the nut member which makes up an optical axis adjustment mechanism and a slide portion.

In accordance with one or more embodiments of the present invention, an automotive headlamp comprising: a housing; a light source unit disposed in front of the housing; and an optical axis adjustment mechanism interposed between the housing and the light source unit for tilting the light source unit about a tilting center axis so as to adjust an optical axis of the light source unit in a tilting fashion, wherein the optical axis adjustment comprises: a tilting fulcrum provided between the housing and the light source unit; an adjusting screw rotatably supported on the housing; and a synthetic resin nut member thread fitted on the adjusting screw and mounted on the light source unit, wherein the synthetic resin nut member interlocks with a rotation of the adjusting screw for forward or backward movement so as to tilt the light source unit about the tilting center axis which passes through the tilting fulcrum, the synthetic resin nut member comprises: a nut member main body; a screw thread fitting portion formed in the nut member main body; and a leaf spring slide portion brought into elastic engagement with a guide groove in the housing so as to carry thereon the synthetic resin nut member and branched off at the nut member main body, the leaf spring slide portion is formed of a first resin, and the nut member main body is formed of a second resin which is superior to the first resin in resistance to heat.

(Function) When aiming the optical axis of the light source unit, the nut member moves forwards or backwards along the adjusting screw by rotating the adjusting screw, and while the slide portion slides along the guide groove as this occurs, even in the event that the adjusting screw is rotated frequently, at the slide portion made of the first resin which is superior in sliding properties and resistance to wear, no permanent set is produced and the slide contact surface does not wear. In addition, at the nut member main body which is made of the second resin which is superior in resistance to heat (which has a high deflection temperature), a looseness is made difficult to be generated in the screw thread fitting portion into which the adjusting screw is thread fitted by such an extent that the nut member main body itself also becomes difficult to be subjected to thermal deformation when compared with a case where the nut member main body is made of the same material (the primary material) as with the slide portion.

In accordance with one or more embodiments of the present invention, the slide portion and the nut member main body are made integral with each other through a screw, bonding or other fixing means.

(Function) A construction in which the slide portion and the nut member main body are made as separate units (separate molded structures) can cope with the complicated shape of the nut member better than a construction in which the slide portion and the nut member main body are integrated into a single unit (for example, an integrally molded structure of a resin), and not only do the constructions of molds for molding the slide portion and the nut member main body, respectively, become simple but also the molding process becomes simple.

In accordance with one or more embodiments of the present invention, the slide portion and the nut member main body, which are made as the separate structures, can simply be made integral with each other through a screw, bonding or other fixing means.

In accordance with one or more embodiments of the present invention, the slide portion and the nut member main body are integrally molded together.

(Function) The slide portion and the nut member main body are molded together, and hence, no work to integrate both the components into a single structure is needed which will be needed when the slide portion and the nut member main body are made as separate structures.

In accordance with one or more embodiments of the present invention, the adjusting screw is made up of a rotational shaft of an automatic headlight leveling actuator, and wherein the optical axis adjustment mechanism makes up an automatic headlight leveling mechanism for rotating the rotational shaft in such a manner that an inclination angle of a vehicle axis relative to a road surface remains constant to thereby tilt the light source unit about a horizontal tilting center axis which passes through the tilting fulcrum.

(Function) When the optical axis adjustment mechanism makes up the automatic headlight leveling mechanism, every time the longitudinal inclination of the vehicle axis relative to the road surface changes, the rotational shaft of the automatic headlight leveling actuator is rotated by a predetermined amount (a rotational angle equivalent to the inclination of the vehicle axis) so as to move the nut member forwards or backwards along the rotational shaft (the adjusting screw) based on a signal from a vehicle axis detecting means such as a center of gravity migration detection sensor, whereby the light source unit is tilted about the horizontal tilting center axis which passes through the tilting fulcrum in a direction to cancel the inclination of the vehicle axis. Namely, since the rotation of the rotational shaft (the adjusting screw) is repeated more frequently in automatic headlight leveling than in headlight aiming, the looseness tends to be generated more in the screw thread fitting portion of the nut member main body by that extent. However, since the nut member main body (made of the second resin which is superior in resistance to heat) is difficult to be subjected to thermal deformation, no looseness is generated in the screw thread fitting portion. In addition, since the leaf spring slide portion of the nut member is caused to slide along the guide groove frequently, there exists a high possibility that the generation of permanent set on the slide portion or wear on the slide contact surface may constitute a more serious problem. However, there is produced no such defective with the slide portion (made of the first resin which is superior in sliding properties and resistance to wear).

Other aspects and advantages of the invention will be apparent from the following description and the appended claims.

REFERENCE NUMERALS AND CHARACTERS

E: aiming mechanism (optical axis adjustment mechanism); P: aiming fulcrum; P1: side-to-side or horizontal aiming point; P2: vertical aiming point; S: lamp compartment; Lx: horizontal tilting center axis which is an automatic headlight leveling axis; Ly: vertical tilting center axis; 10: lamp body which is a housing; 12: front lens; U1, U2: light source unit;

14a, 14b: reflector; 15: lens holder; 16: mount frame which is formed on the lens holder; 18a, 18b: bulb which is a light source; 20: ball and socket joint which constitutes the aiming fulcrum; 22: ball member; 22a: ball portion; 24: bearing; 30, 40: aiming screw; 32, 42: male threaded portion; 60: automatic headlight leveling actuator; 62: automatic headlight leveling actuator rotational shaft; 130A, 130B: nut member; 131A, 131B: nut member main body; 132: screw thread fitting portion; 133A, 133B: elastic hook; 136: tapping screw; 137: slider portion; 138: leaf spring elastic extending piece; 160A, 160B: nut insertion and mount hole; 230A, 230B: nut slide guide; 232: dove-tail groove (guide groove).

DESCRIPTION OF THE PREFERRED EMBODIMENTS

Next, embodiments of the invention will be described with reference to the accompanying drawings.

Figure 1:
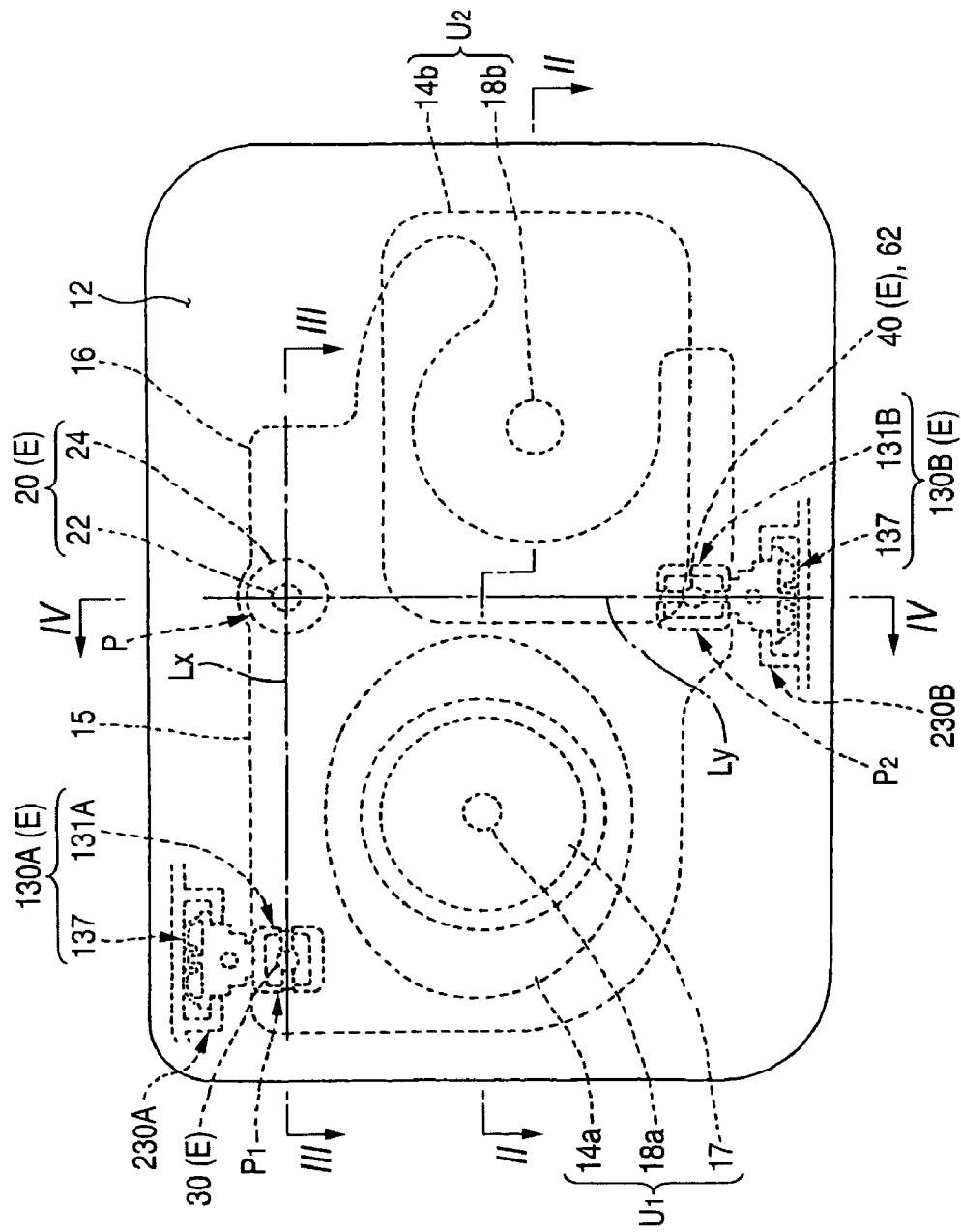
FIG. 1 is a front view of an automotive headlamp according to a first embodiment of the invention.
Figure 2:
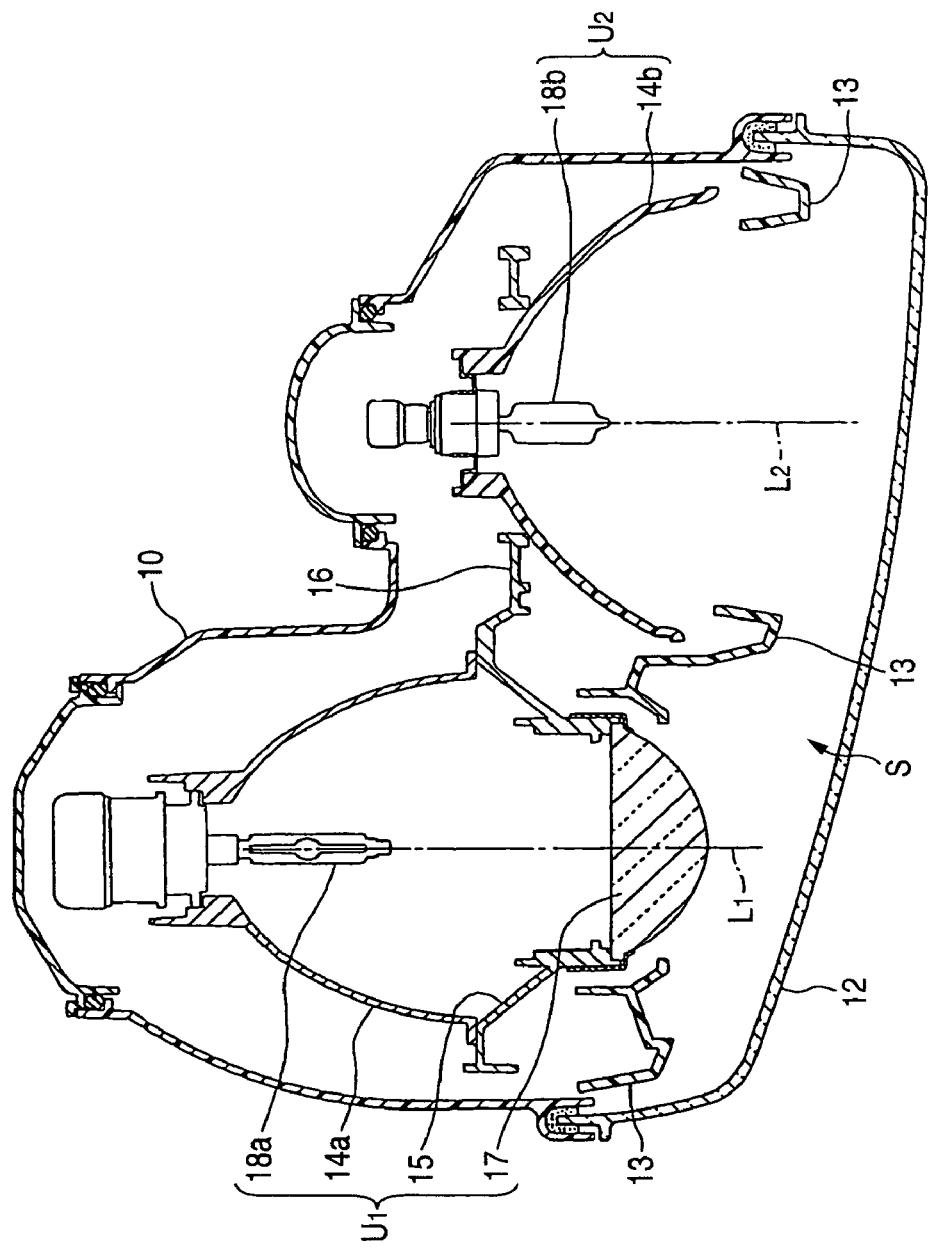
FIG. 2 is a horizontal sectional view (a sectional view taken along the line II-II shown in FIG. 1) of the same headlamp.
Figure 3:
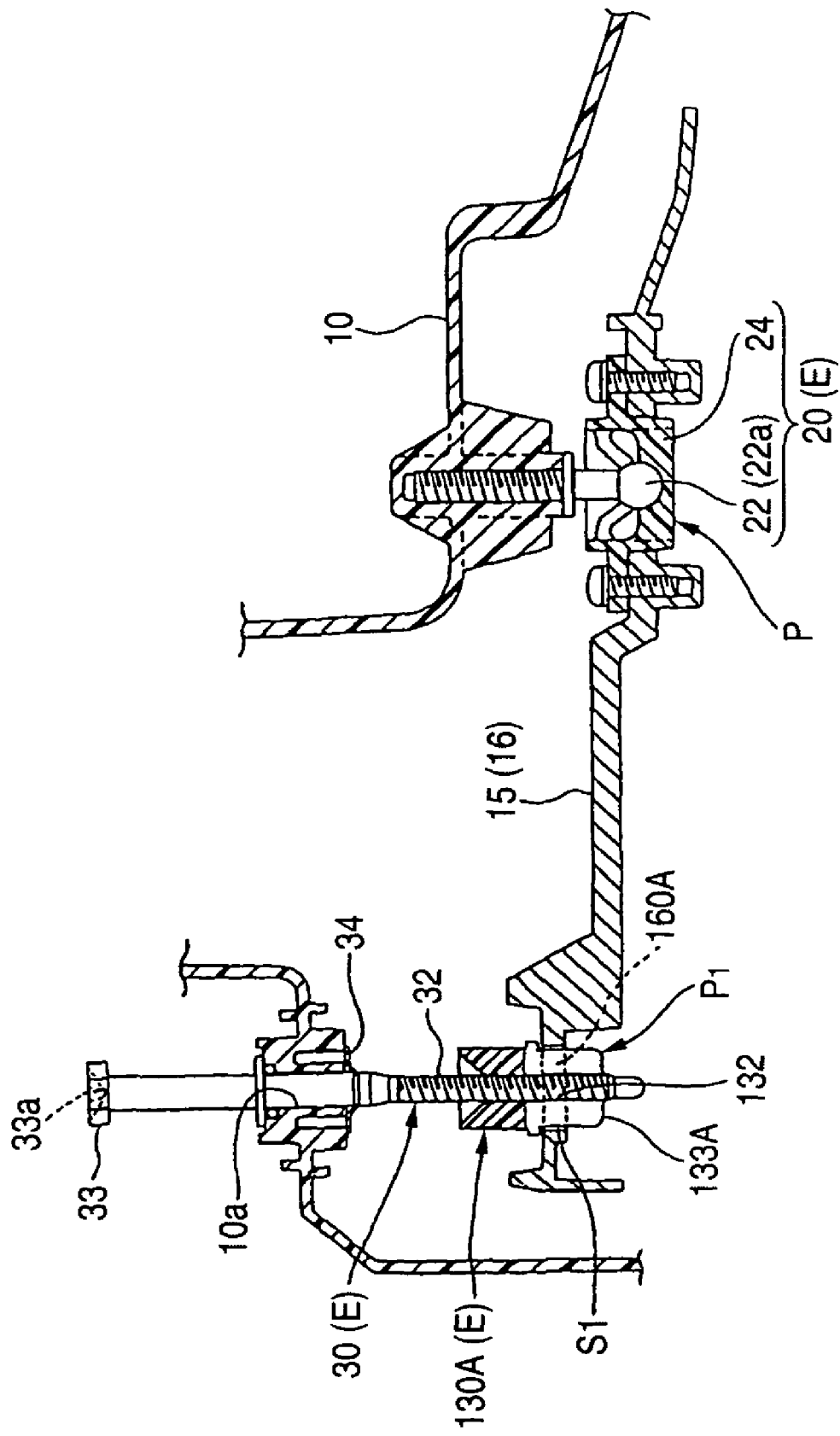
FIG. 3 is a horizontal sectional view (a sectional view taken along the line III-III shown in FIG. 1) of an aiming mechanism.
Figure 4:
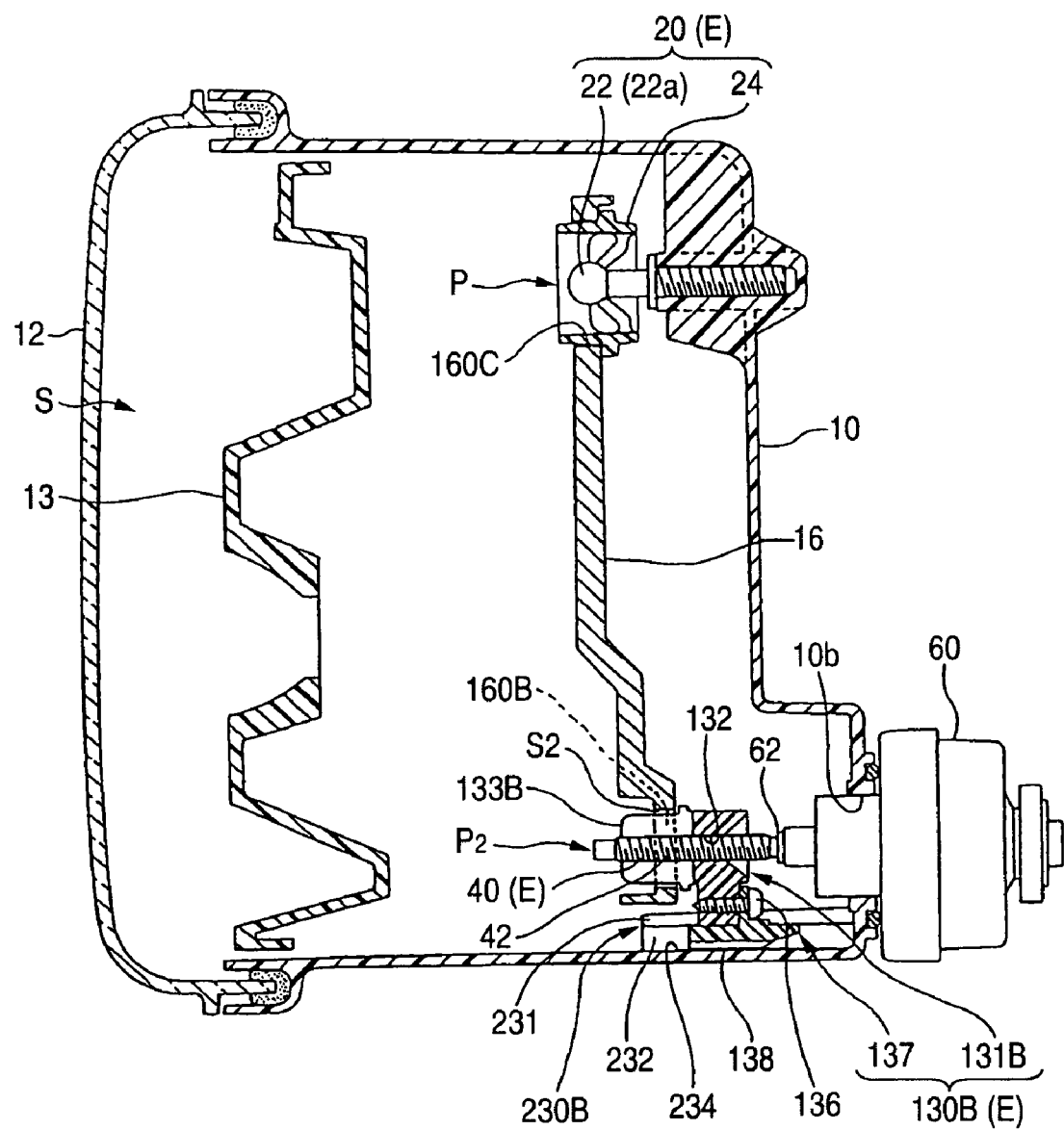
FIG. 4 is a vertical sectional view (a sectional view taken along the line IV-IV shown in FIG. 1) of the headlamp.
Figure 5A:
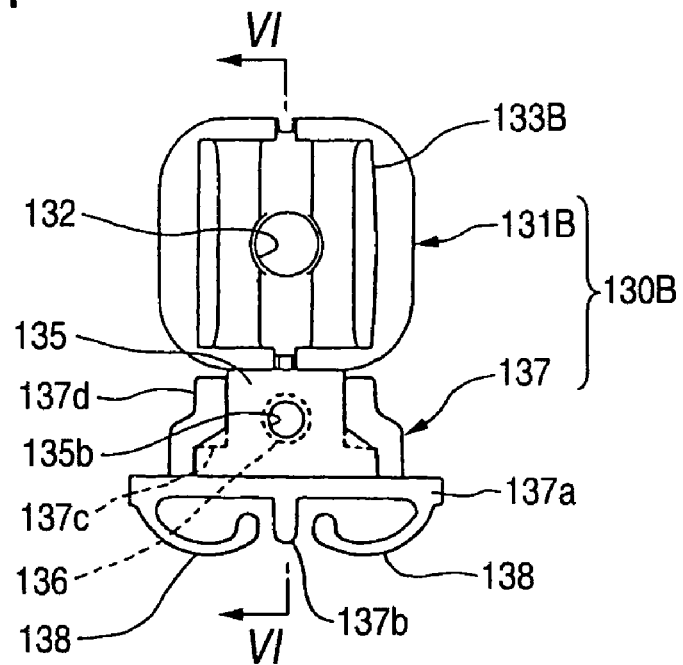
FIG. 5A is a front view of a nut member which constitutes a constituent member of a side-to-side or horizontal aiming point.
Figure 5B:
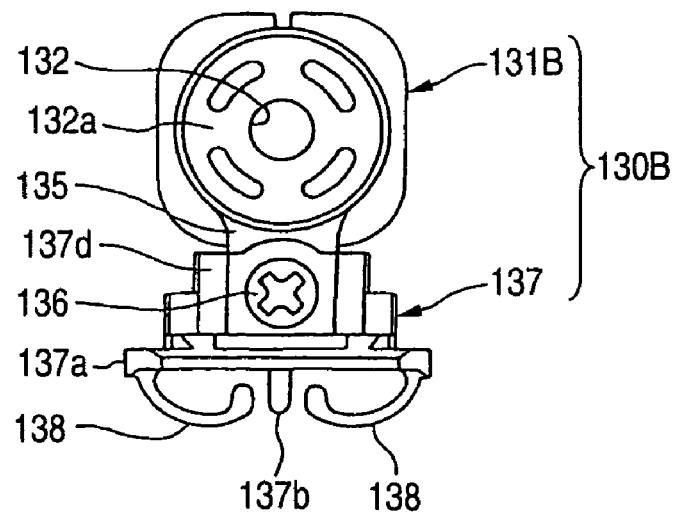
FIG. 5B is a rear view of the same nut member.
Figure 6A:
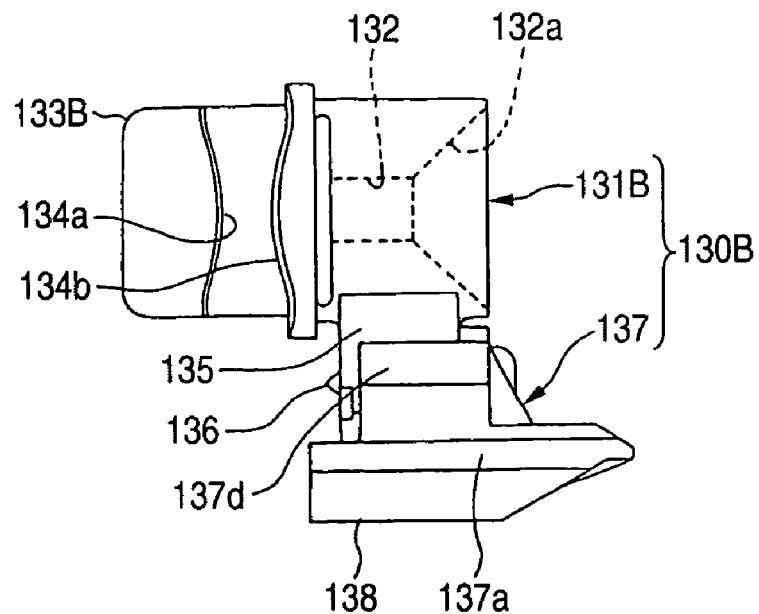
FIG. 6A is a side view of the same nut member.
Figure 6B:
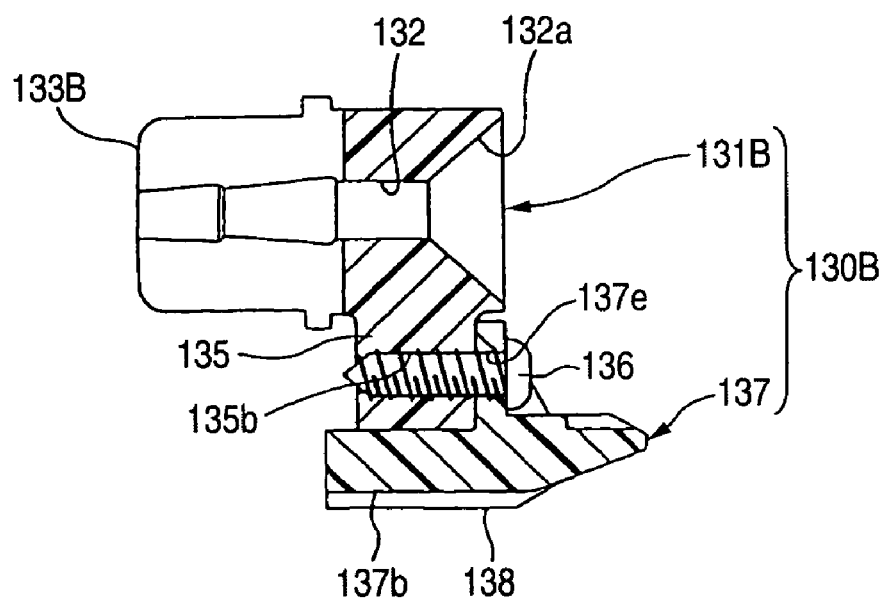
FIG. 6B is a sectional view (a sectional view taken along the line VI-VI shown in FIG. 5A) of the same nut member.
Figure 7:
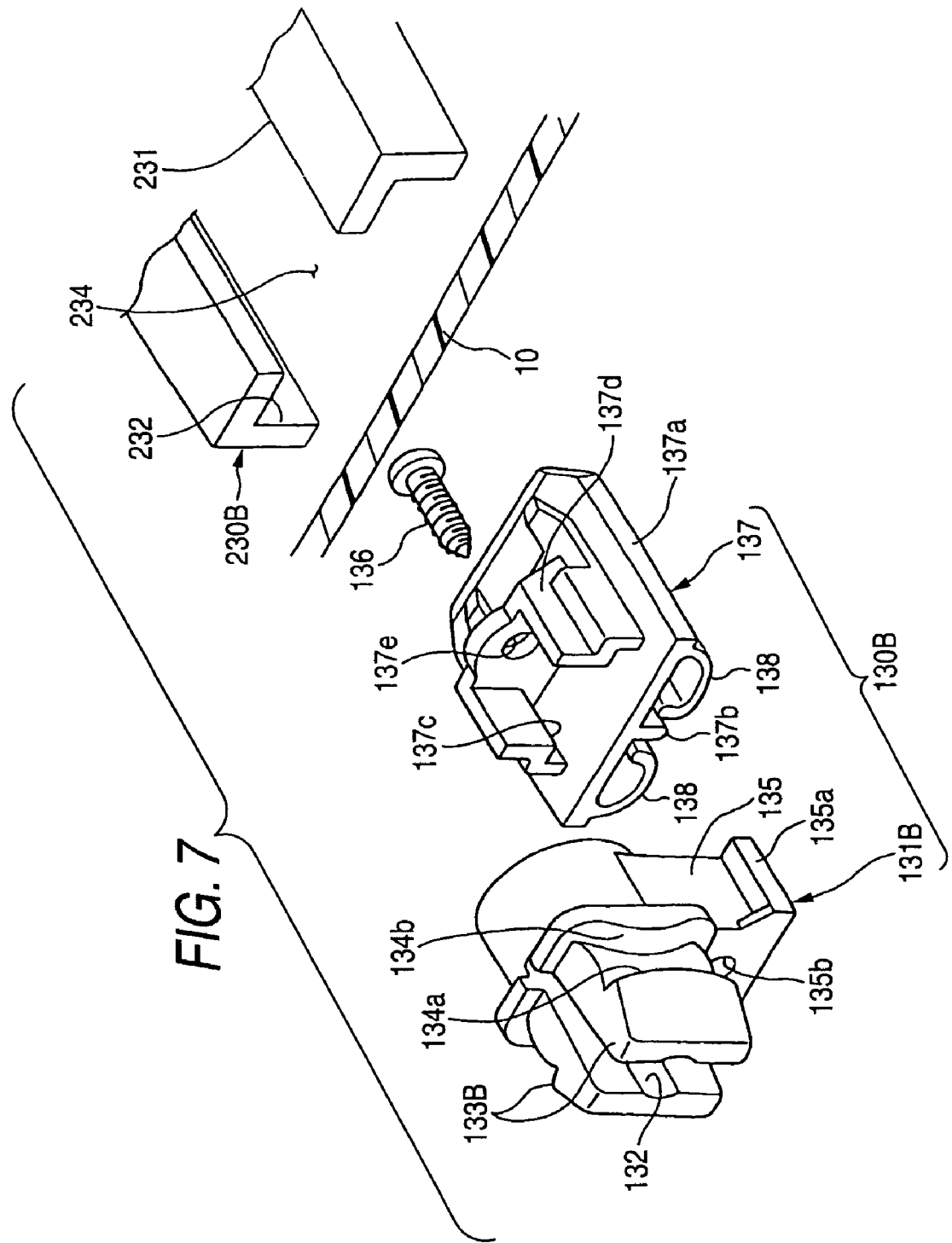
FIG. 7 is an enlarged exploded perspective view showing the periphery of the same nut member.
Figure 8:
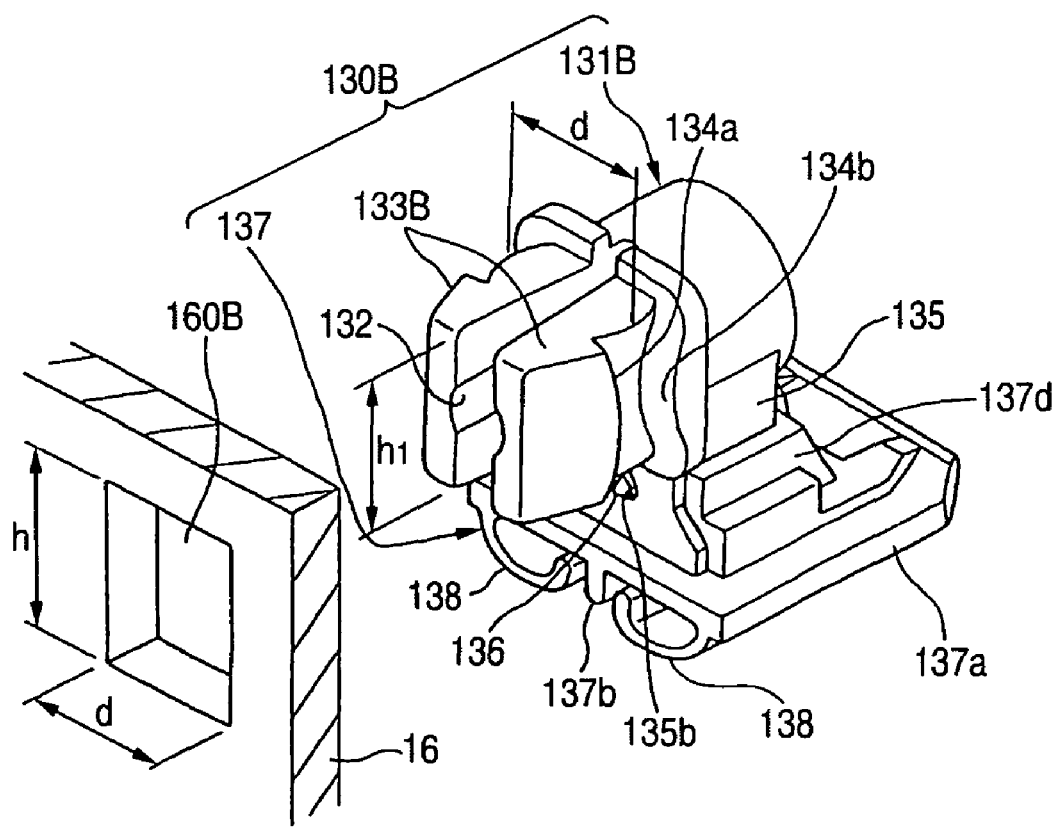
FIG. 8 is a perspective view of the same nut member.
Figure 9:
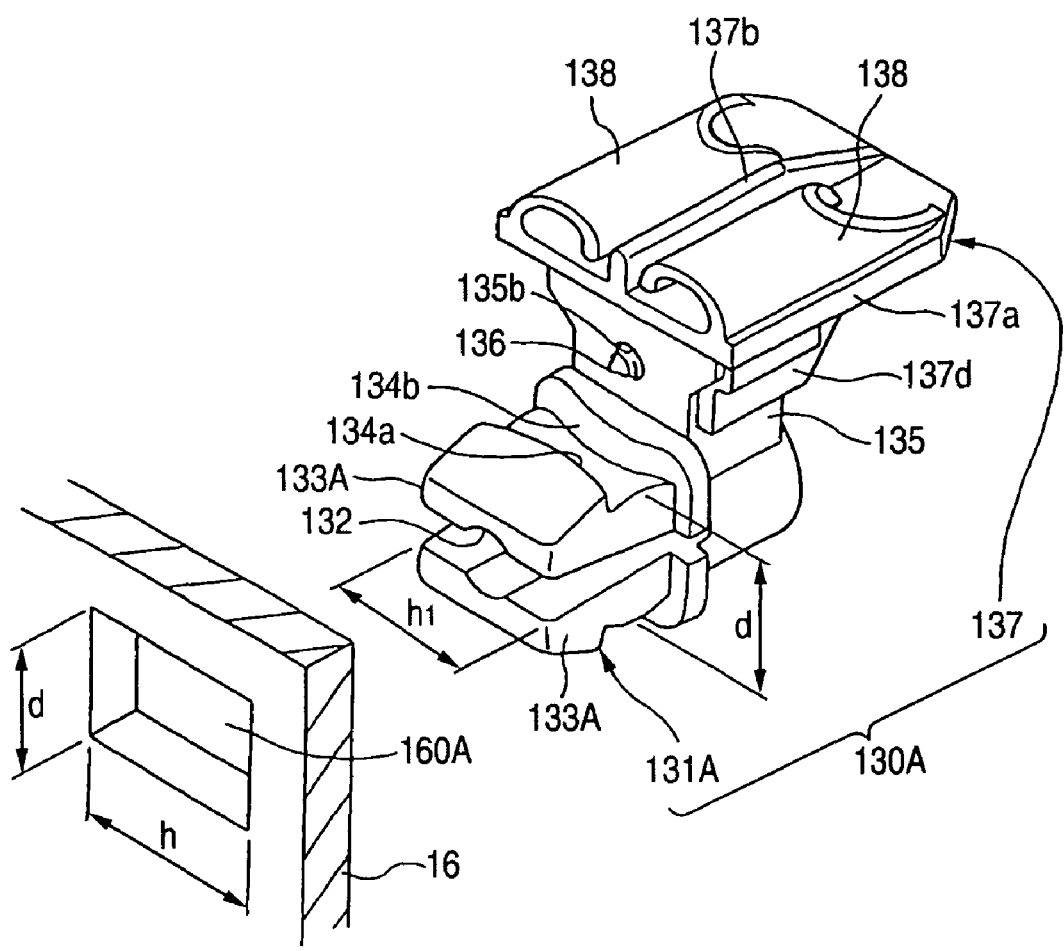
FIG. 9 is a perspective view of a nut member which thread fits on a rotational shaft of an automatic headlight leveling actuator.

FIGS. 1 to 9 illustrates a first embodiment, in which FIG. 1 is a front view of an automotive headlamp according to a first embodiment of the invention, FIG. 2 is a horizontal sectional view (a sectional view taken along the line II-II shown in FIG. 1) of the same headlamp, FIG. 3 is a horizontal sectional view (a sectional view taken along the line III-III shown in FIG. 1) of an aiming mechanism interposed between a lamp body and a light source unit, FIG. 4 is a vertical sectional view (a sectional view taken along the line IV-IV shown in FIG. 1) of the same headlamp, FIG. 5A is a front view of a nut member which constitutes a constituent member of a side-to-side or horizontal aiming point, FIG. 5B is a rear view of the same nut member, FIG. 6A is a side view of the same nut member, FIG. 6B is a sectional view (a sectional view taken along the line VI-VI shown in FIG. 5A) of the same nut member, FIG. 7 is an enlarged exploded perspective view showing the periphery of the same nut member, FIG. 8 is a perspective view of the same nut member, and FIG. 9 is a perspective view of a nut member which thread fits on a rotational shaft of an automatic headlight leveling actuator.

In these drawings, reference numeral 10 denotes a container-like lamp body made of a polypropylene resin, and a front lens 12 is assembled to a front opening in the lamp body 10 to thereby define a lamp compartment S. A low beam and high beam forming light source unit U1 and a high beam forming light source unit U2 are provided within the lamp compartment S in such a manner as to be tilted by means of an aiming mechanism E; in the low beam and high beam forming light source unit U1, a projection lens 17 is integrated, via a lens holder 15, into an oval reflector 14a into which a discharge bulb 18a, which constitutes a light source, is fixedly inserted and in the high beam forming light source unit U2, a halogen bulb 18b, which constitutes a light source, is fixedly inserted and integrated into a parabolic reflector 14b.

Namely, a flange-like mount frame 16, which extends sideways, is integrally formed on the lens holder 15 of the light source unit U1, and the reflector 14b of the light source unit U2 is fixedly mounted on the mount frame 16, whereby the light source unit U1 and the light source unit U2 are made integral with each other. Then, optical axes L1, L2 of the headlamp (optical axes of the light source units U1, U2) can be tilted to be adjusted (aimed) together vertically and horizontally by means of the aiming mechanism E interposed between the lamp body 10 and the mount frame 16. Reference numeral 13 in FIGS. 2, 4 denotes an extension reflector which is interposed between the light source units U1, U2 and the front lens 12 not only to conceal a gap between the light source units U1, U2 and the lamp body 10 but also to allow the entirety of the inside of the lamp compartment S to be seen in a specular color.

The aiming mechanism E is constructed to include a ball and socket joint 20 which is interposed between the lamp body 10 and the mount frame 16 (the light source units U1, U2) and which constitutes an aiming fulcrum (an inclination fulcrum) P, aiming screws (adjusting screws) 30, 40 which pass, respectively, through screw pass-through holes 10a, 10b provided in a back wall of the lamp body 10 to extend forwards while rotatably supported therein, and synthetic nut members 130A, 130B which are thread fitted, respectively, on threaded portions 32, 42 of the aiming screws 30, 40 and are inserted to be mounted, respectively, in nut insertion and mount holes 160A, 160B provided in the mount frame 16 in such a manner as to move forwards or backwards in response to the rotation of the aiming screws 30, 40 to thereby constitute aiming points P1, P2. Note that as shown in FIG. 3, a rotational operating portion 33, which has an external shape of a regular hexagonal cross section and a square groove 33a formed in an end face thereof, is integrally formed on a rear end portion of the aiming screw 30 which is rotatably supported in the screw pass-through hole 10a via a push-on-fix 34, whereby the aiming screw 30 can be operated to rotate using a tool such as a screw driver or spanner.

The ball and socket joint 20, which constitutes the aiming fulcrum P which constitutes, in turn, an inclination fulcrum for the light source units U1, U2, is made up of a ball portion 22a of a ball member 22 fixed to an inside of the back wall of the lamp body 10 and a bearing 24 which is a bearing member mounted on a back side of the mount frame 16. Then, as shown in FIG. 1, the aiming fulcrum (the ball and socket joint 20) is disposed at a substantially transversely central and upper portion of the headlamp when the headlamp is viewed from the front, and the aiming screw 30 and the nut member 130A constituting the aiming point P1 are disposed at a position which is situated in a left-hand side upper corner of the headlamp and which is parallel to the aiming fulcrum P, while the aiming screw 40 and the nut member 130B constituting the aiming point P2 are disposed direct below the aiming fulcrum P.

Reference 60 in FIG. 4 denotes an automatic headlight leveling actuator which is mounted on a rear side of the back wall of the lamp body 10, and a rotational shaft 62 (refer to FIGS. 1, 4) of the actuator 60, which passes through the screw pass-through hole 10b in the lamp body 10 to thereby extend forwards, makes up the aiming screw 40.

Reference numeral 230A (230B) denotes a nut slide guide of a dove-tail groove construction which is a guide groove formed integrally in the lamp body 10, and a slider portion 137 of the nut member 130A (130B) which is thread fitted on the aiming screw 30 (40) is carried on and guided by this slide guide 230A (230B).

Then, when the aiming screw 30 is rotated, the nut member 130A moves forwards or backwards along the threaded portion 32 of the aiming screw 30, whereby the mount frame 16 (the light source units U1, U2) tilts about a vertical tilting center axis Ly which connects the aiming fulcrum P (the ball and socket joint 20) with the aiming point P2 (the nut member 130B). On the other hand, when the aiming screw 40 (the rotational shaft 62) is rotated, the nut member 130B moves forwards or backwards along the threaded portion 42 of the aiming screw 40 (the rotational shaft 62), whereby the mount frame 16 (the light source units U1, U2) tilts about a horizontal tilting center axis Lx which connects the aiming fulcrum P (the ball and socket joint 20) with the nut member 130A. Namely, the aiming screw 30 constitutes a side-to-side or horizontal aiming screw which tilts the optical axes L1, L2 of the headlamp about the vertical tilting center axis Ly for adjustment, whereas the aiming screw 40 (the rotational shaft 62) constitutes a vertical aiming screw which tilts the optical axes L1, L2 of the headlamp about the horizontal tilting center axis Lx for adjustment.

In addition, when the automatic headlight leveling actuator 60 is driven, the mount frame 16 (the light source units U1, U2) tilts about the horizontal tilting center axis Lx which is a leveling axis and which connects the horizontal aiming point P1 to the aiming fulcrum P, whereby the optical axes L1, L2 of the headlamp are automatically tilted to be adjusted vertically according to the running state of the vehicle.

Namely, the actuator 60 rotates the aiming screw 40 (the rotational shaft 62) to thereby move the nut member 130B forwards or backwards based on, for example, a signal from the center of gravity migration detection sensor (not shown) for detecting the forward or backward migration of the position of the center of gravity of the vehicle, whereby the light source units U1, U2 are tilted together about the horizontal tilting center axis Lx, which is a leveling axis, so that the optical axes L1, L2 of the headlamp are maintained in a constant state relative to the road surface on which the vehicle is running.

Next, the construction of the nut member 130A (130B) constituting the aiming mechanism E and the periphery thereof will be described in detail.

Firstly, a nut slide guide 230A (230B), which prevents the rotation of the nut member 130A (130B), carries thereon the nut member 130A (130B) and supports slidably the same nut member, is, as shown in FIGS. 1, 4, 7, is formed into something like a rectangular frame having a dove-tail groove 232 which is a wide guide groove extending longitudinally at a position in the vicinity of the wall surface of the lamp body 10 above (below) the aiming screw 30 (40) and made to open in a side thereof which faces the aiming screw 30 (40). Reference numeral 231 denotes an opening in the dove-tail groove 232. In addition, the nut slide guide 230A (230B) is formed integrally on the wall surface of the lamp body 10, whereby a strength required for the nut slide guide is secured.

On the other hand, the nut member 130A (130B), which is designated as a self-locking nut, is made of a synthetic resin which is superior in rigidity strength and sliding properties and is made up of, as shown in FIGS. 1, 3 to 7, a nut member main body 131A (131B) and the slider portion 137; in the nut member main body 131A (131B), a screw thread fitting portion 132, which is thread fitted on the aiming screw 30 (40) and which extends longitudinally, is formed at a center thereof and a forked elastic hook 133A (133B), which is brought into engagement with the nut insertion and mount hole 160A (160B) in the mount frame 16 so as to be held while prevented from being dislocated from the mount frame 16 is formed at a distal end thereof, and the slider portion 137 is formed integrally with the nut member main body 131A (131B) in such a manner as to branch off at the nut member main body 131A (131B) and is brought into an elastic engagement with the nut slide guide 230A (230B).

Namely, a tapered opening 132a (refer to FIG. 10) is formed on a back side of the nut member main body 131A (131B) in such a manner as to converge on the screw thread fitting portion 132 so that the aiming screw 30 (40) is easily thread fitted into the nut member main body 131A (131B). Then, when the aiming screw 30 (40) is press fitted (hereinafter, referred to as tapped) into the screw thread fitting portion 132 to be passed therethrough while being rotated with the nut member 130A (130B) being temporarily mounted on the mount frame 16 by bringing the elastic hook 133A (133B) into engagement with the nut insertion and mount hole 160A (160B) in the mount frame 16, the forked elastic hook 133A (133B) is expanded by the aiming screw 30 (40) and is then brought into press contact with upper and lower surfaces (left and right surfaces) of the rectangular nut insertion and mount hole 160A (160B) so as to be held in such a manner as to be prevented from being dislocated therefrom.

As shown in FIGS. 1, 8, 9, while in the nut member 130A, the elastic hook 133A is made to be elastically deformed vertically outwards to thereby prevent the dislocation from the nut insertion and mount hole 160A, in the nut member 130B, the elastic hook 133B is made to be elastically deformed transversely outwards to thereby prevent the dislocation from the nut insertion and mount hole 160B, and therefore, in the nut members 130A and 130B, the elastic hooks 133A, 133B are formed at positions which are angularly apart from each other at 90 degrees.

In addition, the rectangular nut insertion and mount hole 160A (160B) is formed so as to be elongated horizontally (vertically) in such a manner as to match a cross sectional shape of the elastic hook 133A (133B) and is, as shown in FIGS. 3, 4, made to form a horizontal gap S1 in the nut insertion and mount hole 160A and a vertical gap S2 in the nut insertion and mount hole 160B, when the nut member 130A (130B), which functions as the self-locking unit, is inserted to be mounted in the nut insertion and mount hole 160A (160B). Namely, as shown in FIGS. 8, 9, a horizontal width h of the nut insertion and mount hole 160A (a vertical width of the nut insertion and mount hole 160B) is formed larger than a horizontal width h1 of the nut member 130A (a vertical width of the nut member 130B).

In addition, as shown in FIGS. 6A, 8 and 9, a distal end-side stepped portion 134a and a proximal end-side stepped portion 134b of the elastic hook 133A (133B) which is brought into engagement with a circumferential edge portion of the nut insertion and mount hole 160A (160B) are formed into arc-like shapes, respectively, so that the nut member 130A (130B) can tilts horizontally relative to the circumferential edge portion of the nut insertion and mount hole 160A (160B) when the nut member 130A (130B) is mounted in the nut insertion and mount hole 160A (160B), whereby an unanticipated stress is prevented from being generated at a mount portion between the nut member 130A (130B) and the mount frame 16 when the mount frame 16 (the light source units U1, U2) tilts about the tilting center axes Ly, Lx.

The slider portion 137 is made up of a rectangular slide plate 137a and a pair of left and right leaf spring elastic extending pieces 138 which are formed on a bottom side of the slider plate 137a. The elastic extending piece 138 extends from an outside towards an inside of the slide plate 137a as viewed in the transverse direction while curving to form an arc-like cross section, and a longitudinally extending vertical rib 137 is formed at a transversely central portion of the slide plate 137a, whereby, when the slider portion 137 is assembled into the nut slide guide 230A (230B), the pair of left and right elastic extending pieces 138 are elastically deformed to thereby be brought into abutment with the vertical rib 137b at distal end portions thereof. Namely, in such a state that the slider portion 137 is in engagement with the dove-tail groove 232 of the nut slide guide 230A (230B), the distal end portions of the elastic extending pieces 138, which are in press contact with an inner wall surface 234 (refer to FIGS. 4, 7) of the lamp body 10, are brought into abutment with both sides of the vertical rib 137b, whereby the elastic extending pieces 138 each form an arch, so that the slider portion 137 is supported in the nut side guide 230A (230B) without any looseness in the vertical and horizontal directions in such a manner as to slide in the longitudinal direction in which the nut slide guide 230A (230B) extends.

The slide guide 230A (230B) supports the weight of the light source units U1, U2 in a suspending fashion via the nut member 130A (130B) and positions the light source units U1, U2 in the horizontal and vertical directions so as to suppress the vertical and horizontal oscillations of the aiming screw 30 (40) (the vertical and horizontal vibrations of the light source units U1, U2). Consequently, the mount frame 16 (the light source units U1, U2) is supported without any looseness in the vertical and horizontal directions and smoothly tilts about the tilting center axes Ly, Lx as the aiming screw 30 (40) is operated to rotate.

Additionally, the nut member 130A (130B) are constructed such that the nut member main body 131A (131B) and the slider portion 137, which are separately formed of a nylon resin and a polyacetal resin, respectively, are fixedly integrated into a single structure by means of a tapping screw 136. To be specific, a wide proximal plate portion 135a at an extending shaft portion 135 of the nut member main body 131A (131B) is brought into engagement with a frame structure-like dove-tail groove 137c situated on a plate portion 137a side of the slider portion 137, and the tapping screw 136 is thread fitted in pass-through holes 137e, 135b formed, respectively, in a dove-tail groove forming frame 137d and the extending shaft portion 135, whereby the nut member main body 131A (131B) and the slider portion 137 are fixedly integrated into the single structure.

In addition, while, when performing a horizontal aiming, the nut member 130A moves forwards or backwards along the aiming screw 30 by virtue of the rotation of the aiming screw 30, and the slider portion 137 slides along the dove-tail groove 232, since the slider portion 137 is made of the polyacetal resin which is superior in sliding properties and resistance to wear, there is caused no permanent set on the slider portion 137 and the slide contact surface thereof does not wear. In addition, since the nut member main body 131A is made of the nylon resin, which is slightly inferior in sliding properties and resistance to wear to the polyacetal resin but is remarkably superior in resistance to heat to the polyacetal resin (having a higher deflection temperature), the nut member main body 131A is difficult to be subjected to thermal deformation, and hence, there is no risk that looseness is generated in the screw thread fitting portion 132.

Furthermore, while, when performing an automatic headlight leveling, the nut member 130B operates to move forwards and backwards frequently along the rotational shaft 62 (the aiming screw 40) by virtue of the rotation of the rotational shaft (the aiming screw 40) and the slider portion 137 slides along the dove-tail groove 232 frequently in the same fashion, since the slider portion 137 is made of the polyacetal resin which is superior in sliding properties and resistance to wear, there is caused no permanent set on the slider portion 137 and the slide contact surface thereof does not wear. In addition, since the nut member main body 131B is made of the nylon resin, which is slightly inferior in sliding properties and resistance to wear to the polyacetal resin but is remarkably superior in resistance to heat to the polyacetal resin (having a higher deflection temperature), the nut member main body 131B is difficult to be subjected to thermal deformation, and hence, there is no risk that looseness is generated in the screw thread fitting portion 132.

Next, a procedure will be described for assembling the light source units U1, U2 into the lamp body 10 via the aiming mechanism E. Firstly, the ball member 22, which is the constituent member of the ball and socket joint, is mounted in the lamp body 10, and following this, the automatic headlight leveling actuator 60 is mounted such that the rotational shaft 62 (the aiming screw 40) thereof is made to extend towards the inside of the lamp body 10, and further, the aiming screw 30 is assembled, whereby the lamp body 10 is disposed in such a manner that the aiming screws 30, 40 are oriented upwards. During these steps, the light source units U1, U2, into which the bulbs 18a, 18b have not yet been inserted and mounted, is integrated into the lamp body 10 via the mount frame 16. Furthermore, the elastic hook 133A, 133B of the nut members 130A, 130B are brought into engagement with the nut insertion and mount holes 160A, 160B in the mount frame 16, respectively, so that the nut members 130A, 130B are temporarily mounted on the mount frame 16, and the bearing 24, which is the constituent member of the ball and socket joint, is mounted in a bearing mount hole 160C. Next, the mount frame 16, which holds the light sources U1, U2 together, is lowered from above the lamp body 10, and the screw thread fitting portions 132 of the respective nut members 130A, 130B are aligned with the distal ends of the respective aiming screws 30, 40. Then, while pressing the mount frame 16 downwards, the aiming screws 30, 40 are rotated, so that the aiming screws 30, 40 are thread fitted, respectively, into the screw thread fitting portions 132 of the respective nut members 130A, 130B through tapping, whereby the nut members 130A, 130B, which are self-locking nuts, are completely mounted, respectively, in the nut insertion and mount holes 160A, 160B, and the slider portions 137 of the nut members 130A, 130B are inserted into the nut slide guides 230A, 230B, respectively. Note that when the mount frame 16 is lowered with the screw thread fitting portions 132 of the nut members 130A, 130B being thread fitted on the aiming screws 30, 40, respectively, the ball portion 22a is automatically press fitted into the bearing 24, whereby the light source units U1, U2, into which the bulbs 18a, 18b have not yet been inserted and mounted, can be assembled into the lamp body 10 via the aiming mechanism E having the automatic headlight leveling mechanism. Lastly, the bulbs 18a, 18b are mounted in the bulb mount holes in the reflectors 14a, 14b, respectively, whereby the headlamp is completed.

Note that while in the aforesaid embodiment, the nut member 130A (130B) is constructed such that the nut member main body 131A (131B) and the slider portion 137, which are separately formed from nylon resin and polyacetal resin, respectively, are fixedly integrated into the single structure by means of the tapping screw 136, the means for fixing the nut member main body 131A (131B) and the slider portion 137 together is not limited to the taping screw 136 but bonding, irregular lance elastic engagement or other known fixing and integrating means may be used.

Figure 10A:
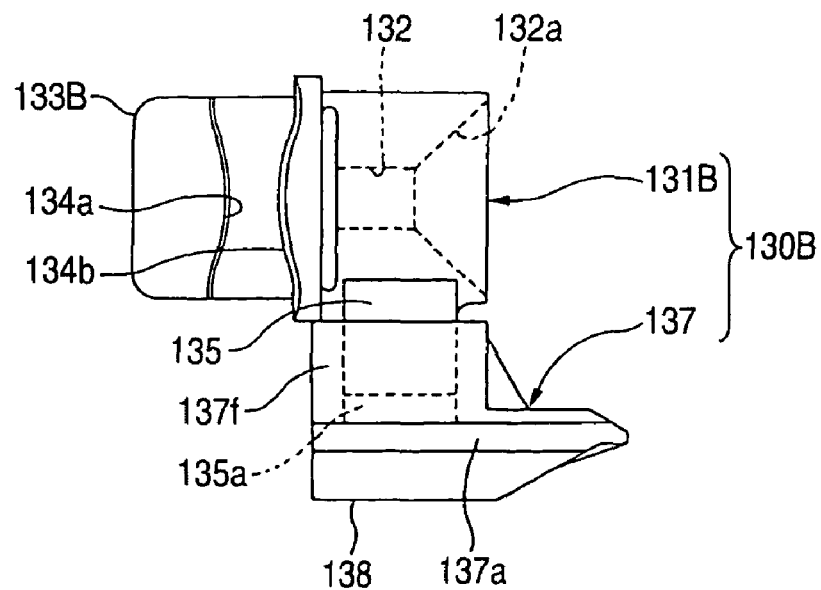
FIG. 10A is a side view of a nut member which constitutes a main portion of automotive headlamp according to a second embodiment of the invention.
Figure 10B:
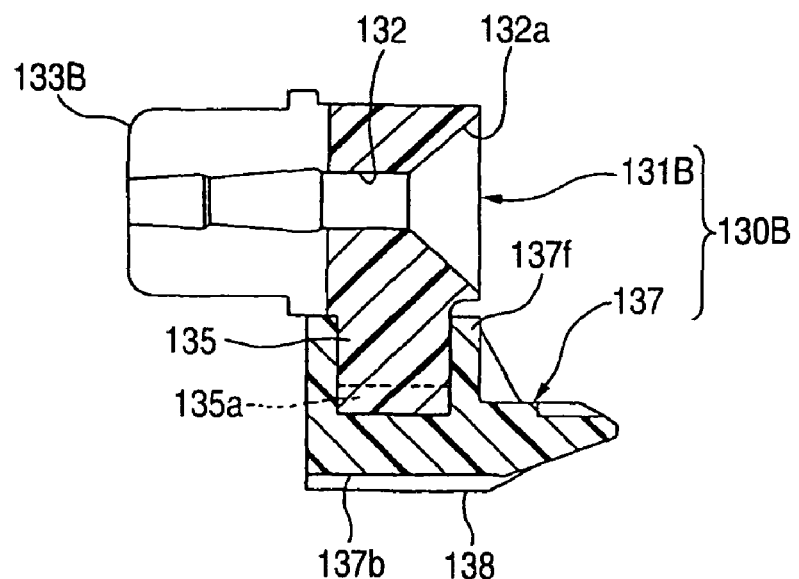
FIG. 10B is a vertical sectional view of the same nut member.
Figure 11:
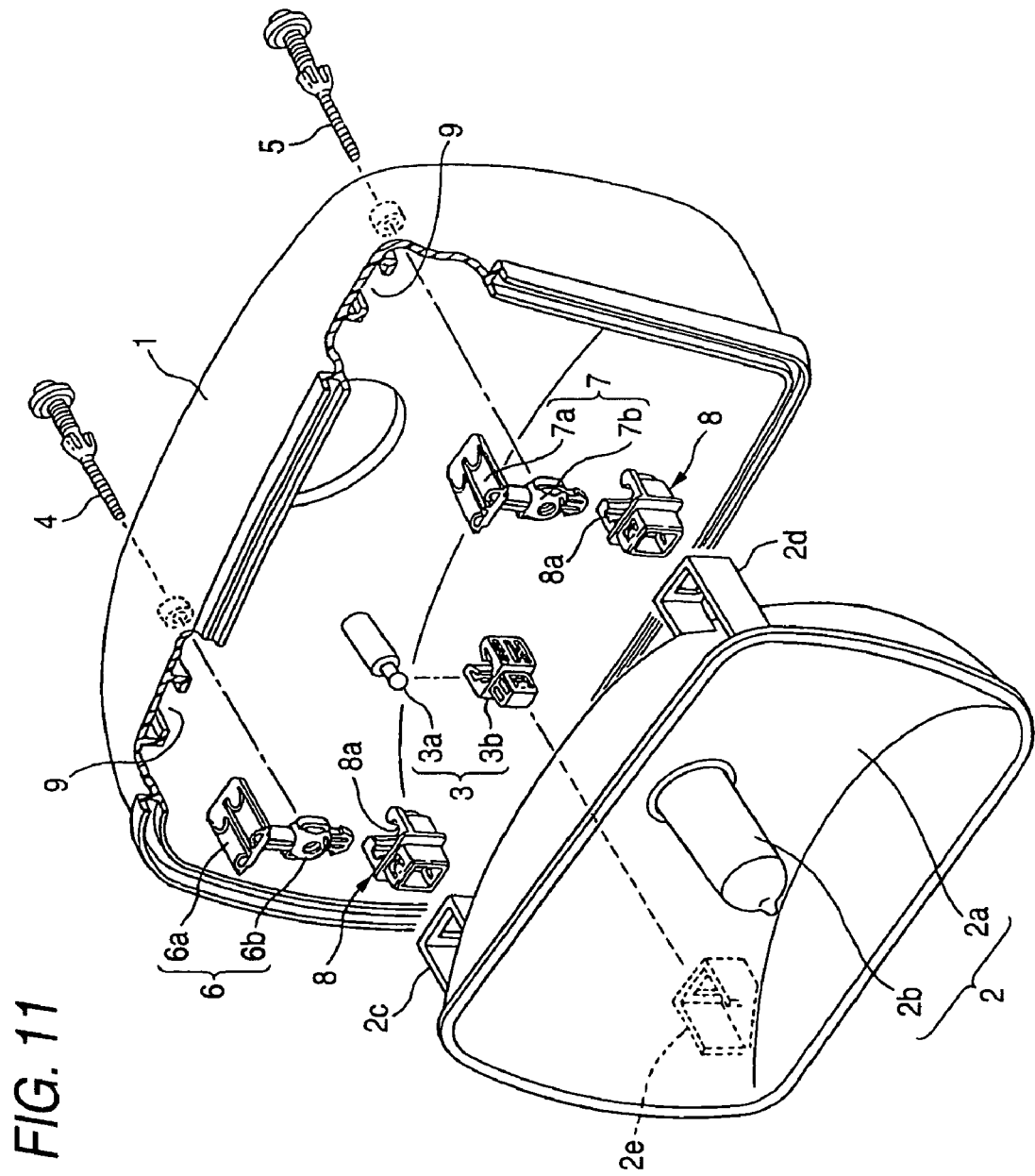
FIG. 11 is an exploded perspective view of a related automotive headlamp.
Figure 12:
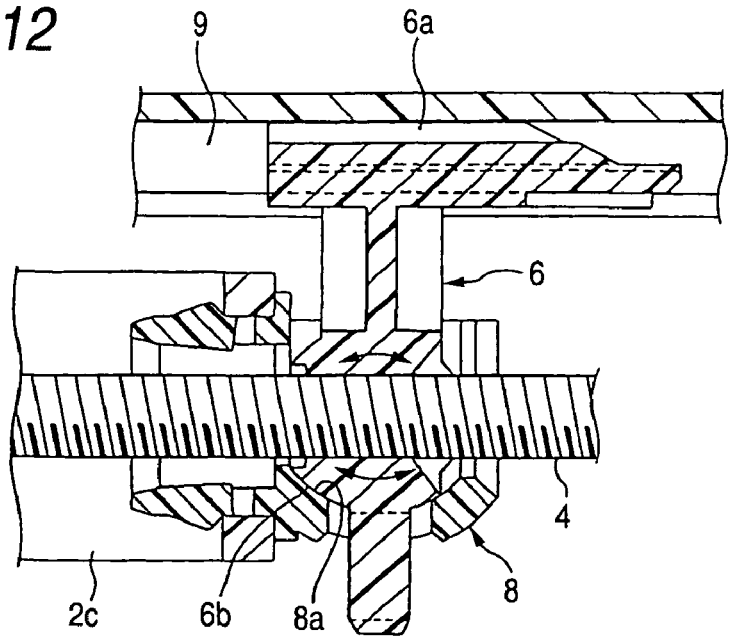
FIG. 12 is a vertical sectional view of a nut member which thread fits on an aiming screw.
Figure 13:
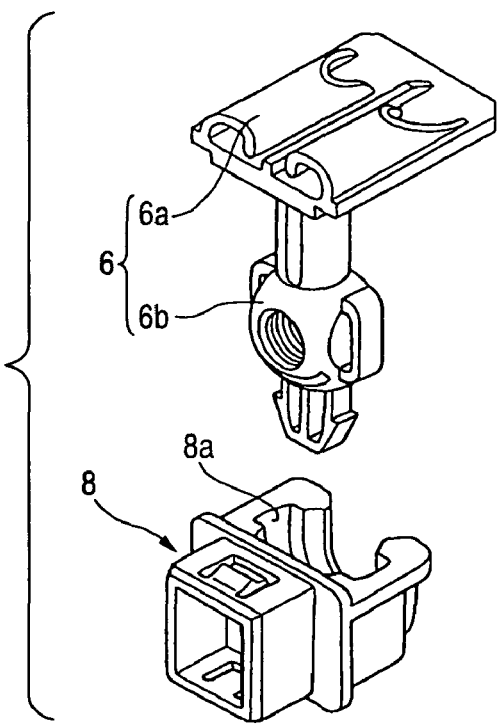
FIG. 13 is an exploded perspective view of a bearing and the nut member.

FIG. 10 illustrates a nut member which constitutes a main portion of a headlamp according to a second embodiment of the invention, in which FIG. 10A is a side view of the nut member, and FIG. 10B is a vertical sectional view of the same nut member.

While in the nut member 130A (130B) in the first embodiment, the nut member main body 131A (131B) and the slider portion 137, which are formed separately, are made to be fixedly integrated into the single structure by means of the tapping screw 136, in a nut member 130A (130B) in the second embodiment, a nut member main body 131A (131B) of a nylon resin and a slider portion 137 of a polyacetal resin are made to be molded together. Note that, in the drawing, the nut member 130B constituting a vertical aiming point P2 is only shown, and the nut member 130A constituting a side-to-side or horizontal aiming point P1 is omitted.

To be specific, the nut member main body 131A (131B), which is formed of nylon resin as a primary molded article, is inserted into a secondary molding mold, and a polyacetal resin having a lower melt temperature than nylon resin is injected to fill the mold, whereby an outer circumference of a wide proximal plate portion 135a of an extending shaft portion 135 of the nut member main body 131A (131B) is covered by a frame structure 137f of the slider portion 137, which is a secondary molded article, so as to prevent the dislocation of the nut member main body 131A (131B) from the slider portion 137.

In this second embodiment, the nylon resin nut member main body 131A (131B) and the polyacetal resin slider portion 137 are molded together so as to be integrated into the single structure in advance, and hence, the construction does not need the work to fixedly integrate both the members into the single structure, which is not required when the slider portion 137 and the nut member main body 131A (131B) are formed separately. Due to this, the work to assemble the aiming mechanism E into the headlamp is simplified by such an extent that the number of constituent components of the aiming mechanism is reduced.

Note that while, in these two embodiments, the nut member main body 131A (131B) of the nut member 130A (130B) is made of nylon resin, and the slider portion 137 is made of polyacetal resin, the materials of the nut member 130A (130B) and the slider portion 137 are not limited there to but any other materials may be used, provided that those materials are superior in sliding properties and resistance to wear and that a material for the slider portion 137 is superior in resistance to heat to a material for the nut member main body 131A (131B).

According to the embodiments of the invention, even in the event that the adjusting screw is rotated frequently, no permanent set is produced on the slide portion and the slide contact surface does not wear. In addition, since no looseness is generated on the screw thread fitting portion of the nut member main body, an accurate optical axis adjustment can be ensured over a long period of time.

According to the embodiments of the invention, since the degree of freedom in designing the shape of the nut member and the manufacture thereof is easy, the production costs thereof can be reduced, and hence, the resulting automotive headlamp can be marketed at a lower price by that extent.

According to the embodiments of the invention, since the number of components making up the optical axis adjustment mechanism can be reduced, and hence, the work to assembly the optical axis adjustment mechanism to the automotive headlamp can be simplified by that extent.

According to the embodiments of the invention, when the optical axis adjustment mechanism makes up the automatic headlight leveling mechanism, while the rotational shaft (the adjusting screw) is rotated frequently so that the slide portion slides frequently along the guide portion, there is generated no looseness in the screw thread fitting portion of the nut member main body, and there is generated no permanent set on the slide portion and the slide contact face does not wear. Therefore, an accurate automatic headlight leveling can be ensured over a long period of time.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An automotive headlamp comprising:
   a housing;
   a light source unit disposed in front of the housing; and
   an optical axis adjustment mechanism interposed between the housing and the light source unit for tilting the light source unit about a tilting center axis so as to adjust an optical axis of the light source unit in a tilting fashion,
   wherein the optical axis adjustment mechanism comprises:
      a tilting fulcrum provided between the housing and the light source unit;
      an adjusting screw rotatably supported on the housing; and
      a synthetic resin nut member thread fitted on the adjusting screw and mounted on the light source unit, wherein the synthetic resin nut member interlocks with a rotation of the adjusting screw for forward or backward movement so as to tilt the light source unit about the tilting center axis which passes through the tilting fulcrum,
   wherein the synthetic resin nut member comprises:
      a nut member main body;
      a screw thread fitting portion formed in the nut member main body; and
      a leaf spring slide portion brought into elastic engagement with a guide groove in the housing so as to carry thereon the synthetic resin nut member and branched off at the nut member main body,
   wherein the leaf spring slide portion is formed of a first resin, and the nut member main body is formed of a second resin which is superior to the first resin in resistance to heat, and
   wherein the leaf spring slide portion is removably attached to the nut member main body.

2. The automotive headlamp according to claim 1, wherein the nut member main body includes:
   two elastic hooks at a distal end of the nut member main body; and
   the screw thread fitting portion which is provided between the two elastic hooks and is thread fitted on the adjusting screw, and
   wherein the two elastic hooks are configured to be expanded by press fitting the adjusting screw into the screw thread fitting portion.

3. The automotive headlamp according to claim 1, wherein the leaf spring slide portion and the nut member main body are made integral with each other.

4. The automotive headlamp according to claim 1, wherein the leaf spring slide portion and the nut member main body are integrally fixed by one of a screw and a bonding means.

5. The automotive headlamp according to claim 1, wherein the adjusting screw comprises a rotational shaft of an automatic headlight leveling actuator, and the optical axis adjustment mechanism comprises an automatic headlight leveling mechanism for rotating the rotational shaft so that an inclination angle of a vehicle axis relative to a road surface remains constant to thereby tilt the light source unit about a horizontal tilting center axis which passes through the tilting fulcrum.

* * * * *